United States Patent [19]
Armbruster et al.

[11] 3,762,081
[45] Oct. 2, 1973

[54] CREDIT CARD
[76] Inventors: Thomas L. Armbruster, 118 E. Phillip Ave., Norfolk; William N. Hill, 12411 Bel Dr., Omaha both of Nebr.
[22] Filed: Sept. 16, 1971
[21] Appl. No.: 180,980

[52] U.S. Cl. .................................................. 40/2.2
[51] Int. Cl. ............................................. G09f 3/02
[58] Field of Search ............... 40/2.2, 5, 6, 110, 40/61, 62; 283/7; 116/135

[56] References Cited
UNITED STATES PATENTS

| | | | |
|---|---|---|---|
| 2,452,747 | 11/1948 | Gomez | 200/43 |
| 2,712,642 | 7/1955 | Jennings | 340/213 |
| 3,399,473 | 9/1968 | Jaffe | 40/2.2 |
| 3,245,697 | 4/1966 | Nugent | 283/7 |
| 3,713,236 | 1/1973 | Roberts | 40/2.2 |
| 53,360 | 3/1866 | Thomas | 40/6 |
| 207,962 | 9/1878 | Guy | 40/6 |
| 686,480 | 11/1901 | Richards | 40/5 X |
| 2,645,867 | 7/1953 | Sternberg | 40/5 |
| 3,604,900 | 9/1971 | Kalt | 340/149 A X |

*Primary Examiner*—Robert W. Michell
*Assistant Examiner*—Wenceslao J. Contreras
*Attorney*—George R. Nimmer

[57] ABSTRACT

A credit card having a row of spaced apart openings formed therein adjacent each of its edges. A slide member is mounted on the card at each of its edges and is adapted to be selectively moved with respect thereto to permit the selective covering of at least one of the openings in the associated row. The card is for use in read-out machines having means therein for passing light or the like through the openings to permit the imprinter to sense where the slide members have been moved to their proper position so that only an authorized person can obtain credit through the use of the card. The proper position of the slide members is known only to the card owner which prevents the card from being used by unauthorized persons.

5 Claims, 6 Drawing Figures

PATENTED OCT 2 1973  3,762,081
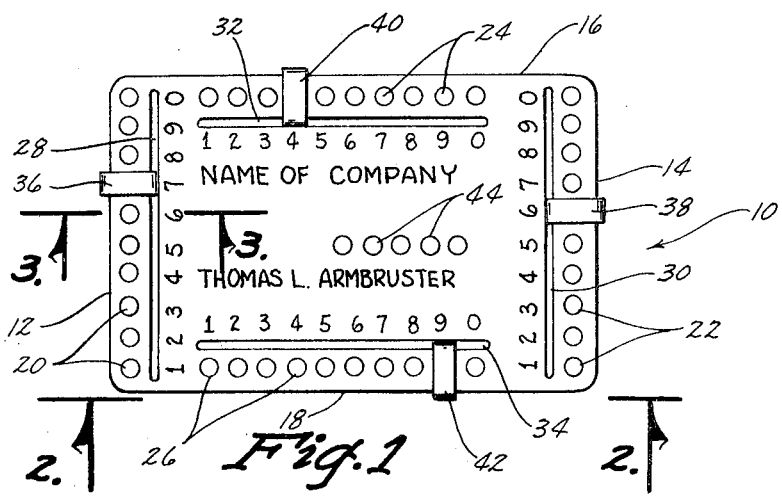
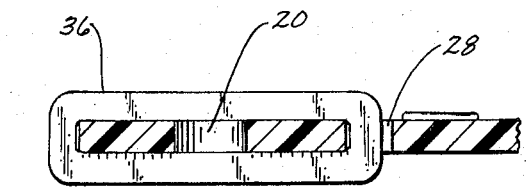
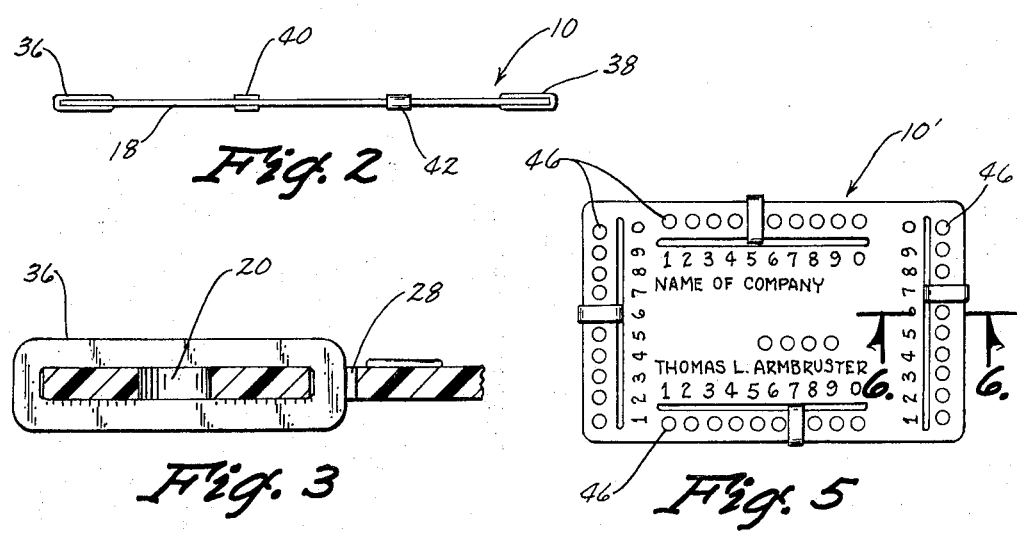
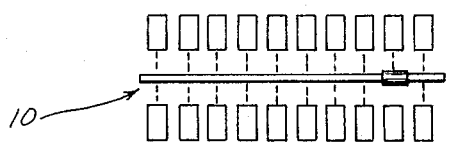
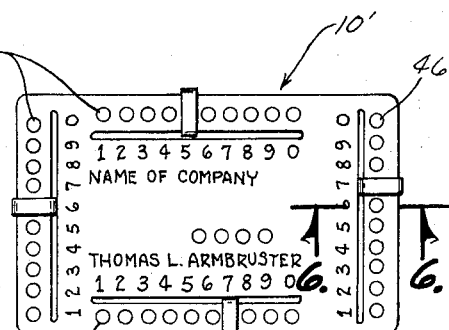
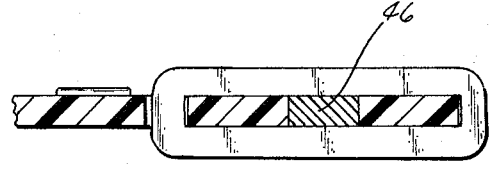
INVENTORS
THOMAS L. ARMBRUSTER
WILLIAM N. HILL
BY
Zarley, McKee & Thomte
ATTORNEYS

CREDIT CARD

The use of credit cards has greatly increased over the years and such use will undoubtedly continue to increase. The problem of lost or stolen credit cards plagues the industry. Some difficulty has also been experienced with counterfeit and forged credit cards. The basic problem is to prevent such unauthorized use of credit cards, attempts at which have been generally unsuccessful. Elaborate electronic credit cards have been provided to prevent the unauthorized use of credit cards but the cost of producing the cards prevents their wide acceptance.

Therefore, a principal object of this invention is to provide a credit card that can only be used by a person authorized to do so.

A further object of this invention is to provide a credit card which is extremely economical of manufacture.

A further object of this invention is to provide a credit card which lends itself to widespread use.

A further object of this invention is to provide a credit card which prevents unauthorized use thereof.

A further object of this invention is to provide a credit card having a plurality of openings formed adjacent its edges and a plurality of auxiliary openings formed inwardly thereof.

A further object of this invention is to provide a credit card which is durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a plan view of the credit card of this invention.

FIG. 2 is an end view of the card as seen on lines 2—2 of FIG. 1:

FIG. 3 is an enlarged sectional view seen on lines 3—3 of FIG. 1:

FIG. 4 is an end view of the credit card illustrating the manner in which light or the like may be passed through the openings to determine whether or not the credit card is being used by unauthorized persons.

FIG. 5 is a plan view of a modified form of the credit card; and

FIG. 6 is an enlarged sectional view seen on lines 6—6 of FIG. 5.

The credit card of this invention is generally designated by the reference numeral 10 and includes end edges 12, 14 and side edges 16, 18. A plurality of openings 20 are formed in the card 10 adjacent edge 12 with a plurality of openings 22 being formed therein adjacent edge 14. A plurality of incrementally spaced openings 24 are formed in the card 10 adjacent edge 16 while a plurality of incrementally spaced openings 26 are formed in the card adjacent edge 18. Elongated body member grooved portions such as slots 28, 30, 32 and 34 are formed in the card inwardly of the openings 20, 22, 24 and 26. Slide members 36, 38, 40 and 42 are slidably mounted in the slots 28, 30, 32 and 34 respectively and are adapted to be selectively positioned by the card owner. Reference indicia is provided adjacent each of the openings so that the card owner may position the respective slide member over a predetermined opening. Auxiliary openings 44 are provided in the body portion of the card to enable the card to convey additional information such as limits of credit or the like.

In use, the company issuing the credit card would send the credit card to the owner for his subsequent use. Ideally, the company issuing the card would inform the card owner by way of a separate letter what his particular combination would be. When the card owner desired to obtain credit, he would slide the slide members in their respective grooves so that the opening corresponding to his particular combination or sequence would be covered. The card would then be placed in a suitable read-out machine to determine whether or not the proper combination had been set. The read-out machine could utilize lights or the like such as illustrated in FIG. 4. The read-out machine would sense which of the openings were covered and would relay the information to an in-line computer or the like. The computer would determine whether the card had the proper combination and would relay the information back to the place that the card was being used. It is possible that electrical contacts could also be positioned at opposite sides of the card to read or sense the openings. Thus, the credit card of this invention may only be used by a person having the knowledge of the proper combination of the slide members. The read-out machine would indicate to the operator when the card is being used by such an authorized person. It can be appreciated that if the credit card is lost or stolen, its use would be prevented due to the fact that only the authorized user knows the proper slide combination. After the card has been used to obtain credit, the operator would ordinarily move the slide members out of their correct combination so that if the card is subsequently lost, the finder would not be able to use the card since he would not know the proper combination, A modified card is illustrated in FIGS. 5 and 6 and is referred to by the reference numeral 10'. The only difference between card 10' and card 10 is that circular magnets 46 or magnetic material is placed in the openings. The slide members shield the magnetic effects of the magnet 46 so that a readout machine could determine if the proper combination has been set.

Thus it can be seen that the credit card of this invention accomplishes at least all of its stated objectives.

We claim:

1. A credit card article comprising:
   A. A flat body member having peripheral edges including opposite ends and opposite sides, said body member being provided with numerous aperture type openings arranged into a plurality of distinct linear multi-apertures rows wherein for each row the apertures are incrementally spaced therealong, at least one of said linear multi-apertures rows being located substantially parallel along a body member peripheral edge, said body member being also provided with a continuously linearly grooved portion extending adjacently parallel along respective multi-apertures rows; and
   B. A slide member movably associated with the body member along respective linearly grooved portions thereof, said slide member when being moved covering individual apertures of a said body member multi-apertures row.

2. The credit card article of claim 1 wherein said body member is provided with an elongate slot therethrough and alongside respective multi-apertures rows to provide said linearly grooved portion, and slide members being slidably mounted in said respective body member slotted portions.

3. The credit card article of claim 1 wherein the body member carries reference indicia located adjacent respective apertures of a linear multi-apertures row.

4. The credit card article of claim 1 wherein there are at least four linear multi-apertures rows and positioned respectively along the two ends and the two sides of said body member.

5. The credit card article of claim 1 wherein there is magnetic material carried by the body member and located within respective apertures of the linear multi-apertures rows.

* * * * *